US012646325B2

(12) United States Patent
Park

(10) Patent No.: US 12,646,325 B2
(45) Date of Patent: Jun. 2, 2026

(54) VIDEO ANALYSIS SYSTEM USING EDGE COMPUTING

(71) Applicant: EdgeDX Co., Ltd., Seoul (KR)

(72) Inventor: Dong Uk Park, Seoul (KR)

(73) Assignee: EdgeDX Co., Ltd., Seoul (KR)

( * ) Notice: Subject to any disclaimer, the term of this patent is extended or adjusted under 35 U.S.C. 154(b) by 325 days.

(21) Appl. No.: 18/203,073

(22) Filed: May 30, 2023

(65) Prior Publication Data

US 2023/0386213 A1 Nov. 30, 2023

(30) Foreign Application Priority Data

May 30, 2022 (KR) ........................ 10-2022-0066365

(51) Int. Cl.
| | |
|---|---|
| *G06V 20/52* | (2022.01) |
| *G06V 10/776* | (2022.01) |
| *G06V 10/94* | (2022.01) |
| *G06V 20/40* | (2022.01) |
| *G08B 13/196* | (2006.01) |
| *H04N 7/18* | (2006.01) |

(52) U.S. Cl.
CPC ............ *G06V 20/52* (2022.01); *G06V 10/776* (2022.01); *G06V 10/95* (2022.01); *G06V 20/40* (2022.01); *G08B 13/19602* (2013.01); *H04N 7/183* (2013.01)

(58) Field of Classification Search
CPC ...... G06V 20/52; G06V 10/776; G06V 10/95; G06V 20/40; G06V 10/87; G06V 10/82; G06V 20/44; G06V 20/46; G08B 13/19602; G08B 29/186; H04N 7/183; H04N 7/181; H04N 21/251; H04N 21/2393; G06N 3/045; G06N 3/08; H04L 67/1001

See application file for complete search history.

(56) References Cited

U.S. PATENT DOCUMENTS

| | | | | |
|---|---|---|---|---|
| 2021/0326619 A1* | 10/2021 | Liu | ........................ | G06F 18/21 |
| 2021/0326641 A1* | 10/2021 | Tsai | ........................ | G06F 18/22 |

FOREIGN PATENT DOCUMENTS

| | | | | |
|---|---|---|---|---|
| JP | 2020-113964 A | 7/2020 | | |
| KR | 10-2022-0000181 A | 1/2022 | | |
| KR | 10-2022-0000424 A | 1/2022 | | |
| KR | 20220000181 | * 1/2022 | ............ | G06N 3/045 |
| KR | 10-2022-0055512 A | 5/2022 | | |
| KR | 10-2395440 A | 5/2022 | | |

(Continued)

OTHER PUBLICATIONS

Sadat et al, ("Quality-Aware Video Analytics in Edge Computing Environments", 2022 IEEE 19th Annual Consumer Communications & Networking Conference (CCNC), pp. 449-452) (Year: 2022).*

(Continued)

*Primary Examiner* — Amara Abdi

(57) ABSTRACT

A video analysis system is a system in which a video is analyzed through an edge device installed in each site to generate a security event, and when the edge device continuously generates erroneous security events, the video is analyzed through another edge device or a cloud server in parallel, and then a deep learning model enabling the edge device not to generate an erroneous security event is found to change the edge device, thereby maintaining high video analysis quality.

8 Claims, 3 Drawing Sheets

(56)          References Cited

FOREIGN PATENT DOCUMENTS

KR          20220055512          *    5/2022    ............... G06N 3/08

OTHER PUBLICATIONS

Kim et al, (A Method for Optimizing Deep Learning Object Detection in Edge Computing, 2020 IEEE, pp. 1164-1167) (Year: 2020).*

Non-final Office Action mailed on Oct. 21, 2024 from the Korean Patent Office for Application No. 10-2022-0066365.

Notice of Allowance mailed on Dec. 4, 2025 from the Ministry of Intellectual Property for Application No. 10-2022-0066365.

* cited by examiner

VIDEO ANALYSIS SYSTEM USING EDGE COMPUTING

CROSS-REFERENCE TO RELATED APPLICATIONS

This application claims priority to and benefit of Korean Patent Application No. 10-2022-0066365, filed May 30, 2022, in the Korean Intellectual Property Office, the disclosures of which are incorporated herein by reference in their entirety.

BACKGROUND OF THE INVENTION

Field of the Invention

The present invention relates to edge computing technology, and more particularly to technology for analyzing a video using edge computing.

Description of the Related Art

Edge computing is technology for performing processing, such as analysis of data collected from a device, on an edge where the data is generated, rather than on a central server or in the cloud, and is based on a distributed computing environment. Cloud computing is technology for processing all data transmitted from a lot of devices in a central server, and limitations thereof have been witnessed as the number of peripheral devices has increased.

When edge computing is used, it is possible to distribute data to a lot of edge devices and process the data therein, thereby reducing a time for delivering data to a central server and analyzing the data.

Edge computing technology has been used for video processing using artificial intelligence (AI). In general, edge devices have uniform and unified hardware in video analysis using AI technology and have limited resources when compared to a central server. Therefore, when these edge devices are applied to a security field, videos difficult to distinguish may be continuously input for each installed site, and thus even when the same edge device is installed, analysis quality may be different. In some sites, there is a problem that customer complaints occur due to an increase in false security events (for example, false alarms).

SUMMARY OF THE INVENTION

An object of the present invention is to provide a video analysis system using edge computing configured to analyze a video of an edge device continuously generating erroneous security events by utilizing external resources to update a deep learning model with a deep learning model enabling the corresponding edge device to analyze a currently input video with higher quality.

In accordance with the present invention, the above and other objects can be accomplished by the provision of a video analysis system using edge computing, and the video analysis system includes a plurality of edge devices and a cloud server.

Each of the edge devices includes a processor and a plurality of program modules including program instructions executable by the processor.

The program modules executed in the edge device include a video analysis module, an analysis request module, and an analysis support module.

The video analysis module generates a security event by processing a video clip captured by at least one camera through a deep learning model, the analysis request module receives input of feedback on an erroneously generated security event and transmits a video analysis request including a video clip generating the corresponding security event, and the analysis support module executes video analysis requested through a deep learning model in response to the received video analysis request and transmits an execution result.

The video analysis module may include a plurality of deep learning models having different degrees of advancement, and process video analysis by replacing a deep learning model in response to receiving feedback on an erroneously generated security event.

The cloud server includes a processor and a plurality of program modules including program instructions executable by the processor.

The program modules executed in the cloud server include an analysis request distribution module and a model selection module.

The analysis request distribution module selects at least one edge device to process the received video analysis request, and delivers the corresponding video analysis request, and the model selection module receives a video analysis execution result, and selects an optimal deep learning model according to an analysis result.

The program modules executed in the cloud server may further include a parallel analysis module configured to process and analyze the received video analysis request in parallel through a plurality of different deep learning models, and at this time the analysis request distribution module may deliver the received video analysis request to the parallel analysis module.

The parallel analysis module may select at least one edge device and deliver the corresponding video analysis request.

The video analysis request transmitted by the edge device may further include environment information, and at this time the model selection module may map and store environment information and a selected deep learning model for an edge device requesting video analysis.

The program modules of the cloud server may further include a first model transmission module configured to deliver a selected deep learning model to an edge device requesting video analysis, and the program modules of the edge device may further include a model update module configured to update a deep learning model with a deep learning model received from the cloud server.

The program modules of the cloud server may further include a second model transmission module configured to transmit, to the edge device, a deep learning model mapped to environment information according to environment changes.

The program modules of the cloud server may further include a feedback processing module configured to receive input of feedback on an erroneously generated security event, and deliver a video analysis request including a video clip stored for the corresponding security event to the analysis request distribution module or the parallel analysis module.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The foregoing and additional aspects are embodied through embodiments described with reference to the accompanying drawings. It is understood that components of each embodiment may be variously combined within one embodiment unless otherwise stated or there is contradiction therebetween. Each block in a block diagram may represent a physical component in a case, and may be a logical representation of a part of a function of one physical component or a function across a plurality of physical components in another case. Sometimes the entity of a block or part thereof may be a set of program instructions. All or some of these blocks may be implemented by hardware, software, or a combination thereof.

Figure 1:
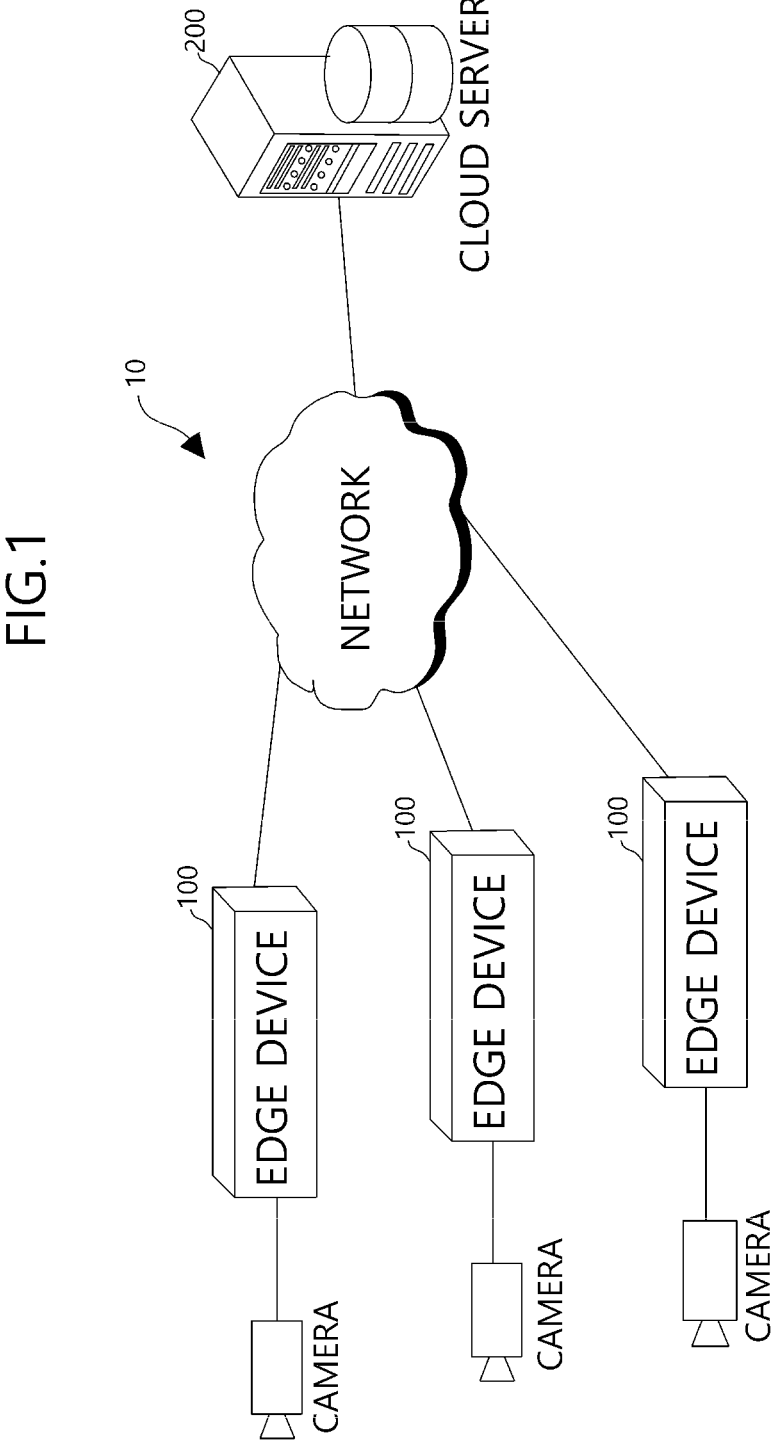
FIG. 1 illustrates a video analysis system using edge computing of the present invention.

FIG. 1 illustrates a video analysis system using edge computing of the present invention. A video analysis system according to an aspect of the present invention is a video analysis system using edge computing and includes a plurality of edge devices 100 and a cloud server 200.

Each of the edge devices 100 is a device installed at each site and is also referred to as an edge box. In general, a plurality of edge devices is installed, and the edge device is a video analysis device configured to generate a security event by analyzing a video at an edge. The edge device 100 is connected to at least one camera through a network to input a video for analysis, or connected to a storage device for storing a captured video through a network. According to an aspect of the invention, the edge device 100 may include at least one camera, and in this case, the edge device 100 and the camera may be connected to each other through a bus. In addition, the camera included in the edge device 100 may be an AI camera including an AI module. The edge devices 100 are connected to each other through a network.

The edge device 100 is a computing device configured to analyze a video, and includes a processor and a memory connected to the processor and including program instructions executable by the processor. The edge device 100 may be a computer device that further includes a storage device, a display, an input device, etc. in addition to the processor and the memory. The processor is a processor configured to executes program instructions, and the memory is connected to the processor and stores program instructions executable by the processor, data to be used for operation by the processor, data processed by the processor, etc.

The edge device 100 includes a plurality of program modules including program instructions executable by the processor.

Figure 2:
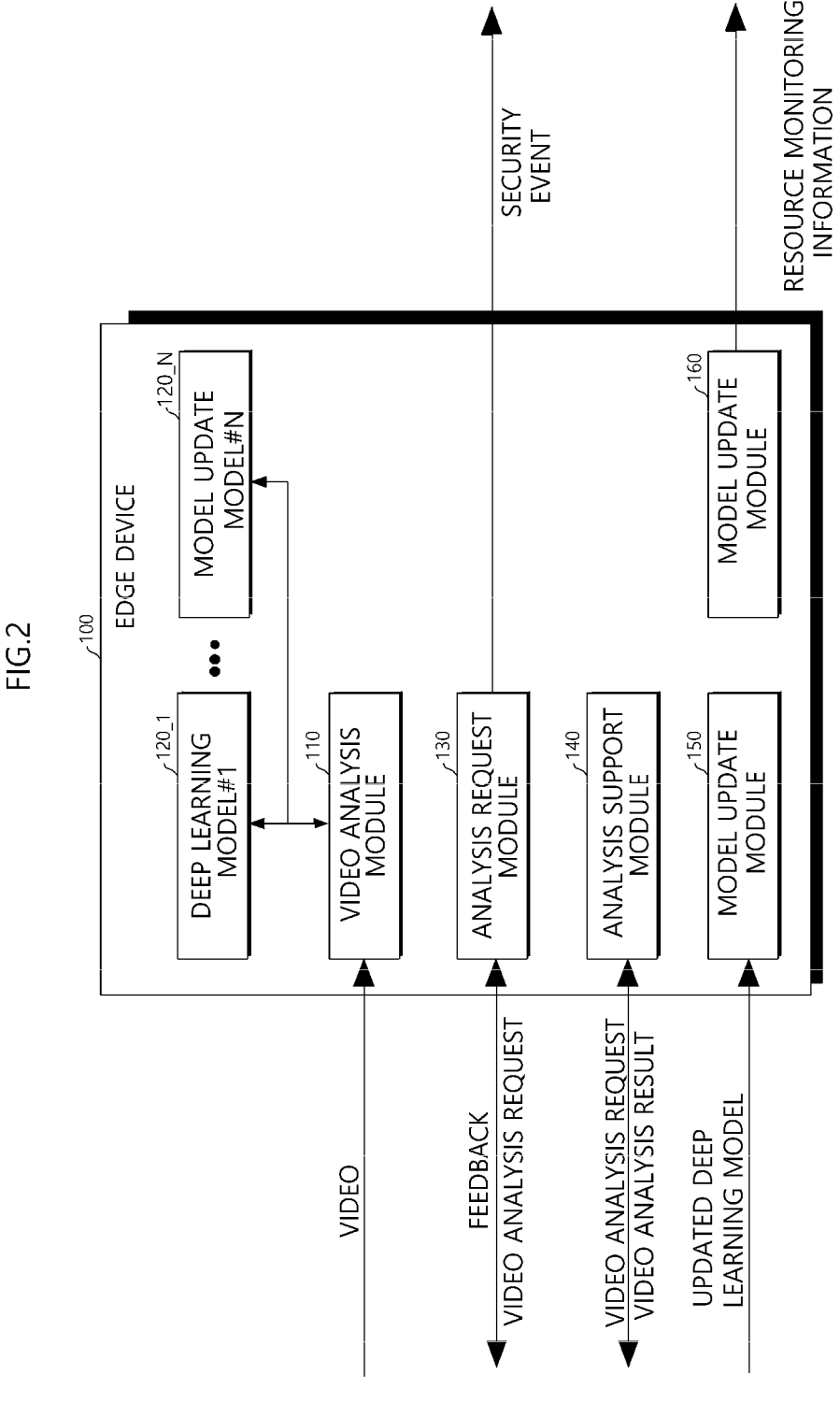
FIG. 2 is a block diagram of program modules of an edge device of the present invention.

FIG. 2 is a block diagram of program modules of the edge device of the present invention. The program modules executed in the edge device 100 include a video analysis module 110, an analysis request module 130, and an analysis support module 140. Further, the edge device 100 may include at least one deep learning model 120 trained to perform video analysis such as detecting an object from an input video. When the edge device 100 includes a plurality of deep learning models 120 (for example, deep learning model #1, . . . , deep learning model #N), each of the deep learning models 120_1, . . . , 120_N may have different model algorithms, the number of deep learning layers may be different, or resolution of input data may be different. That is, each of the deep learning models 120_1, . . . , 120_N may have a different degree of advancement. According to another aspect of the invention, each of the deep learning models 120_1, . . . , 120_N may be the same deep learning model. However, even in the case of the same deep learning model, that is, even when the models have the same algorithm and the same structure, the models may be trained using different training data sets. As an example, even in the case of the same deep learning model that detects a person, one model may be a model trained using a training data set bounding a box from a head to toes, and other models may be models each trained using a training data set bounding a box from a head to shoulders. The edge device 100 may select an appropriate deep learning model from among the plurality of deep learning models 120_1, . . . , 120_N in consideration of device performance according to device resource usage, and use the deep learning model for video analysis.

The video analysis module 110 generates a security event by processing video clips captured by at least one camera through the deep learning model 120. The video analysis module 110 preprocesses an input video in accordance with input data of the deep learning model 120 currently being used for video analysis, then inputs the video to the deep learning model 120, and generates a security event according to an output result of the deep learning model 120. For example, when the edge device 100 is installed at a specific site to detect intrusion and detects intrusion of a person among security guards, the video analysis module 110 causes a corresponding site manager to generate an alarm, that is, a security event.

The site manager receiving the security event performs appropriate processing for the security event. When the generated security event is an erroneously generated security event, that is, a false alarm, feedback thereof may be reported to the edge device 100 or the cloud server 200. When the feedback is reported to the cloud server 200, the cloud server 200 may deliver the corresponding feedback to the edge device 100 generating the erroneous security event, and may perform video analysis in the cloud server 200.

The analysis request module 130 receives feedback on the erroneously generated security event, and transmits a video analysis request including a video clip generating the corresponding security event to another device. The edge device 100 has relatively limited resources compared to the cloud server 200. The analysis request module 130 applies a deep learning model more advanced than the deep learning model 120 currently used for video analysis, and upon determining that current remaining resources are insufficient to perform video analysis, the analysis request module 130 transmits analysis request of the video generating the erroneous security event to the outside, that is, to another edge device 100 or the cloud server 200.

As mentioned above, the edge device 100, in more detail, the video analysis module 110 of the edge device 100 may include a plurality of deep learning models having different degrees of advancement. Thus, upon determining that resources of the edge device 100 are sufficient in response to receiving feedback on an erroneously generated security event, the analysis request module 130 does not request video analysis from other devices, and may first replace a currently executed deep learning model (for example, deep learning model #1) with a more advanced deep learning model (deep learning model #N) to process video analysis.

The analysis support module 140 executes video analysis requested through the deep learning model 120 in response to a video analysis request received from the outside, that is, another edge device 100 or the cloud server 200, and transmits an execution result. The analysis support module 140 may execute the requested video analysis using a deep learning model more advanced than a deep learning model used for video analysis of an edge device 100 generating an erroneous security event. Accordingly, the video analysis request may further include information on a deep learning model used for video analysis by the corresponding edge device 100 in addition to a video to be used for analysis. Upon determining that the edge device 100 does not have resources for processing the requested video analysis request, the analysis support module 140 may not execute requested video analysis and transmit a result indicating that analysis could not be performed.

The program modules of the edge device 100 may further include a resource management module 160. The resource management module 160 may continuously monitor resource usage of a processor, a memory, etc. of the current device, and transmit resource monitoring information of the corresponding device to the outside, that is, to another edge device 100 or the cloud server 200.

The cloud server 200 is connected to the plurality of edge devices 100 through a network. The cloud server 200 is a computing device and is a device including a processor and a memory, which is connected to the processor and includes program instructions executable by the processor. The cloud server 200 may be a computer device that further includes a storage device, a display, an input device, etc. in addition to the processor and the memory. The processor is a processor configured to execute program instructions, and the memory is connected to the processor and stores program instructions executable by the processor, data to be used for operation by the processor, data processed by the processor, etc.

Figure 3:
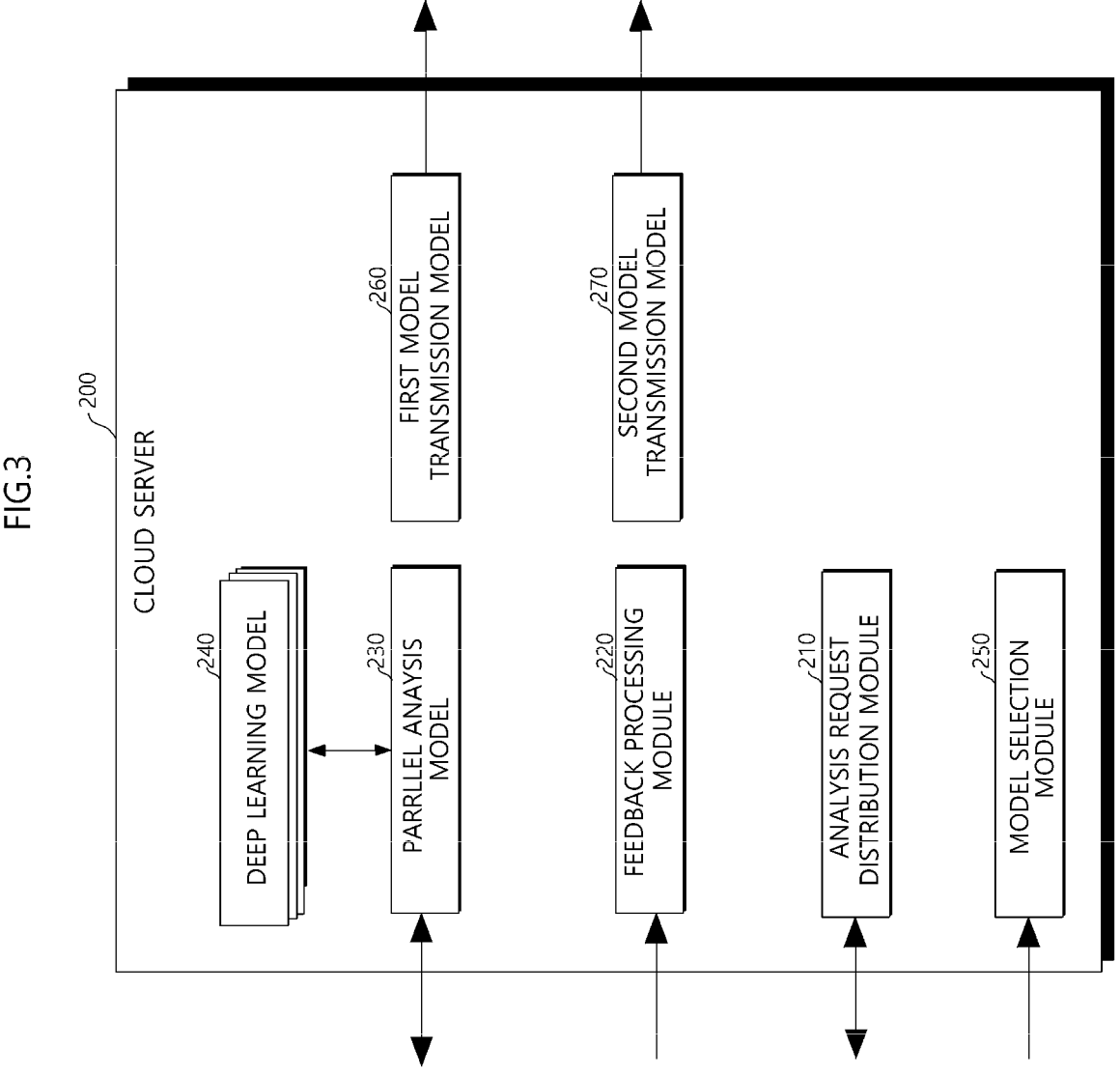
FIG. 3 is a block diagram of program modules of a cloud server of the present invention.

FIG. 3 is a block diagram of program modules of the cloud server of the present invention. The cloud server 200 includes a plurality of program modules including program instructions executable by a processor, and the program modules executed in the cloud server 200 include an analysis request distribution module 210 and a model selection module 250.

The analysis request distribution module 210 selects at least one edge device 100 to process a video analysis request received from an edge device 100, and delivers the corresponding video analysis request. The analysis request distribution module 210 may periodically receive resource monitoring information from the edge devices 100, or deliver a resource monitoring information request to each edge device 100 and receive a report. Upon selecting the edge device 100 to process the video analysis request, an analysis request model selects the edge device 100 by utilizing the resource monitoring information of each edge device 100.

The model selection module 250 receives a video analysis execution result, and selects an optimal deep learning model according to an analysis result. That is, the model selection module 250 selects a deep learning model of an edge device 100 having a high prediction probability or accuracy for a correct answer among analysis results of the ground truth as the optimal deep learning model.

According to an additional aspect of the present invention, the program modules executed in the cloud server 200 may further include a parallel analysis module 230.

The analysis request distribution module 210 may determine to analyze a received video analysis request in the cloud server 200 without selecting an edge device 100 and delivering the received video analysis request. In this case, the analysis request distribution module 210 transfers the received video analysis request to the parallel analysis module 230.

The parallel analysis module 230 may process and analyze the received video analysis request in parallel through a plurality of different deep learning models 240. That is, the parallel analysis module 230 may analyze a video in parallel through a plurality of deep learning models trained using training data of different degrees of enhancement and/or different environments. Here, the different environments mean different characteristics of weather, time, and place, and each deep learning model 240 is trained using training data suitable for each environment. In addition, each deep learning model 240 may be trained by varying a degree of advancement using training data suitable for the same environment.

The cloud server 200 is a computing device having more resources, that is, higher performance, than that of the edge device 100, and thus may analyze a video by simultaneously executing a plurality of deep learning models 240 in parallel.

The purpose of parallel analysis is to find a deep learning model suitable for an edge device 100 continuously generating erroneous security events. A deep learning model analyzing the ground truth with the highest probability in parallel analysis may be an optimal deep learning model suitable for an edge device 100 continuously generating erroneous security events to request video analysis.

According to an aspect of the invention, the parallel analysis module 230 may select at least one edge device 100, and deliver the corresponding video analysis request. That is, parallel analysis is not executed only in the cloud server 200 and some edge devices 100 may participate therein. In this case, the parallel analysis module 230 may select an edge device 100 to participate in parallel analysis by referring to resource monitoring information received from the edge device 100 and stored in the analysis request distribution module 210.

To select an optimal deep learning model, the parallel analysis module 230 delivers analysis results, including an analysis result received from the edge device 100 selected for parallel analysis, to the model selection module 250.

According to an additional aspect of the present invention, the program modules executed in the cloud server 200 may further include a feedback processing module 220.

The feedback processing module 220 is a module configured to receive and process feedback on an erroneously generated security event. The feedback processing module 220 may process the feedback on the erroneously generated security event by delivering the feedback to an edge device 100 generating the corresponding security event, and when a video clip stored for the corresponding security event is stored in the cloud server 200, the feedback processing module 220 may generate a video analysis request including the corresponding video clip, and deliver the video analysis request to the analysis request distribution module 210 or the parallel analysis module 230.

According to another aspect of the present invention, the video analysis request transmitted by the edge device 100 may further include environment information, and at this time, the model selection module 250 may map and store the environment information and the selected deep learning model for the edge device 100 requesting video analysis.

The environment information included in the video analysis request is information about characteristics of weather, time, place, etc. The deep learning model that analyzes a video may have different accuracy of analysis since characteristics of input video data vary depending on the environment. The model selection module 250 stores information indicating which environment information generates an erroneous security event when the edge device 100 generating the erroneous security event and requesting video analysis has the environment information, and which deep learning model does not generate the security event or generates fewer security events at this time when the deep learning model is used. That is, since the requesting edge device 100 continuously generates erroneous security events in an environment of the environment information included in the video analysis request, the environment information is mapped and stored, and the deep learning model selected through video analysis is mapped and stored as an optimal model matching the ground truth with the highest probability to the environment of the environment information included in the video analysis request.

According to an additional aspect of the present invention, the program modules of the cloud server 200 may further include a first model transmission module 260 configured to deliver the selected deep learning model to the edge device 100 continuously generating erroneous security events even when video analysis is requested or not requested, and the program modules of the edge device 100 may further include a model update module 150 configured to update a deep learning model with a deep learning model received from the cloud server 200.

In general, the edge devices 100 are installed in a plurality of sites, and are continuously operated as installed until update is performed for the respective devices once the devices are installed. In particular, the deep learning model used for video analysis is trained in the form of a black box and used without change as modeled.

In addition, the edge device 100 is manufactured to include the same hardware and software and is installed for each site. Therefore, unless the edge device 100 is updated, the edge device 100 is generally used without change. However, accuracy of video analysis varies depending on the environment of the site where the edge device 100 is installed, and even for one edge device 100, quality of video analysis may vary depending on the changing environment.

The video analysis system 10 of the present invention may update a deep learning model used for video analysis so that optimal video analysis results may be derived at all times according to the environment after the edge device 100 is installed.

As a result acquired by processing a video analysis request received from an edge device 100 continuously generating erroneous security events, the first model transmission module 260 transmits a deep learning model selected by being predicted not to generate an erroneous security event in a current environment to an edge device 100 requesting video analysis.

The model update module 150 of the edge device 100 may update a deep learning model so that a deep learning model received from the cloud server 200 through the network is used instead of the deep learning model currently used for video analysis. As a result, the edge devices 100 may maintain high video analysis quality for each device by performing video analysis using a different deep learning model for each site.

According to another aspect of the present invention, the program modules of the cloud server 200 may further include a second model transmission module 270 configured to transmit, to the edge device 100, a deep learning model mapped to environment information according to environment changes.

The model selection module 250 of the cloud server 200 maps an optimal deep learning model for the corresponding edge device 100 to environment information and stores the deep learning model. Thus, the cloud server 200 may preemptively transmit a deep learning model suitable for the corresponding environment through the second model transmission module 270 before the corresponding edge device 100 generates an erroneous security event according to environment changes (for example, changes of weather and time).

The model update module 150 of the edge device 100 may update a deep learning model so that a deep learning model received from the cloud server 200 through the network is used instead of the deep learning model currently used for video analysis.

Accordingly, the edge device 100 may maintain high video analysis quality even under a changed environment without generating erroneous security events that have been continuously generated in the previous environment.

According to the present invention, it is possible to analyze a video of an edge device continuously generating erroneous security events by utilizing external resources to update a deep learning model with a deep learning model enabling the corresponding edge device to analyze a currently input video with higher quality.

The present invention has been described above through embodiments with reference to the accompanying drawings. However, the present invention is not limited thereto, and should be interpreted to cover various modifications that may be obviously derived by those skilled in the art. The claims are intended to cover such modifications.

What is claimed is:

1. A video analysis system using edge computing, the video analysis system comprising:

an edge device comprising a processor and a plurality of program modules including program instructions executable by the processor, the program modules comprising a video analysis module configured to generate a security event by processing a video clip captured by at least one camera through a deep learning model, an analysis request module configured to receive input of feedback on an erroneously generated security event, determine whether resources are sufficient, replace a currently executing deep learning model with a more advanced deep learning model to process video analysis when the resources are determined to be sufficient, and transmit a video analysis request including a video clip generating the corresponding security event when the resources are determined to be insufficient, and an analysis support module configured to execute video analysis requested through the deep learning model in response to the received video analysis request and transmit an execution result; and a cloud server comprising a processor and a plurality of program modules including program instructions executable by the processor, the program modules comprising an analysis request distribution module configured to select at least one edge device to process the received video analysis request, and deliver the corresponding video analysis request, and a model selection module configured to receive a video analysis execution result, and select an optimal deep learning model according to an analysis result.

2. The video analysis system according to claim 1, wherein:

the program modules of the cloud server further comprise a parallel analysis module configured to process and analyze the received video analysis request in parallel through a plurality of different deep learning models; and the analysis request distribution module delivers the received video analysis request to the parallel analysis module.

3. The video analysis system according to claim 2, wherein the parallel analysis module selects at least one edge device and delivers the corresponding video analysis request.

4. The video analysis system according to claim 1, wherein:

the video analysis request transmitted by the edge device further includes environment information; and the model selection module maps and stores environment information and a selected deep learning model for an edge device requesting video analysis.

5. The video analysis system according to claim 1, wherein:

the program modules of the cloud server further comprise a first model transmission module configured to deliver a selected deep learning model to an edge device requesting video analysis; and the program modules of the edge device further comprise a model update module configured to update the deep learning model with a deep learning model received from the cloud server.

6. The video analysis system according to claim 4, wherein:

the program modules of the cloud server further comprise a second model transmission module configured to transmit, to the edge device, a deep learning model mapped to environment information according to environment changes; and the program modules of the edge device further comprise a model update module configured to update the deep learning model with a deep learning model received from the cloud server.

7. The video analysis system according to claim 1, wherein the video analysis module includes a plurality of deep learning models having different degrees of advancement, and processes video analysis by replacing a deep learning model in response to receiving feedback on an erroneously generated security event.

8. The video analysis system according to claim 2, wherein the program modules of the cloud server further comprise a feedback processing module configured to receive input of feedback on an erroneously generated security event, and deliver a video analysis request including a video clip stored for the corresponding security event to the analysis request distribution module or the parallel analysis module.

* * * * *